Figure 1:
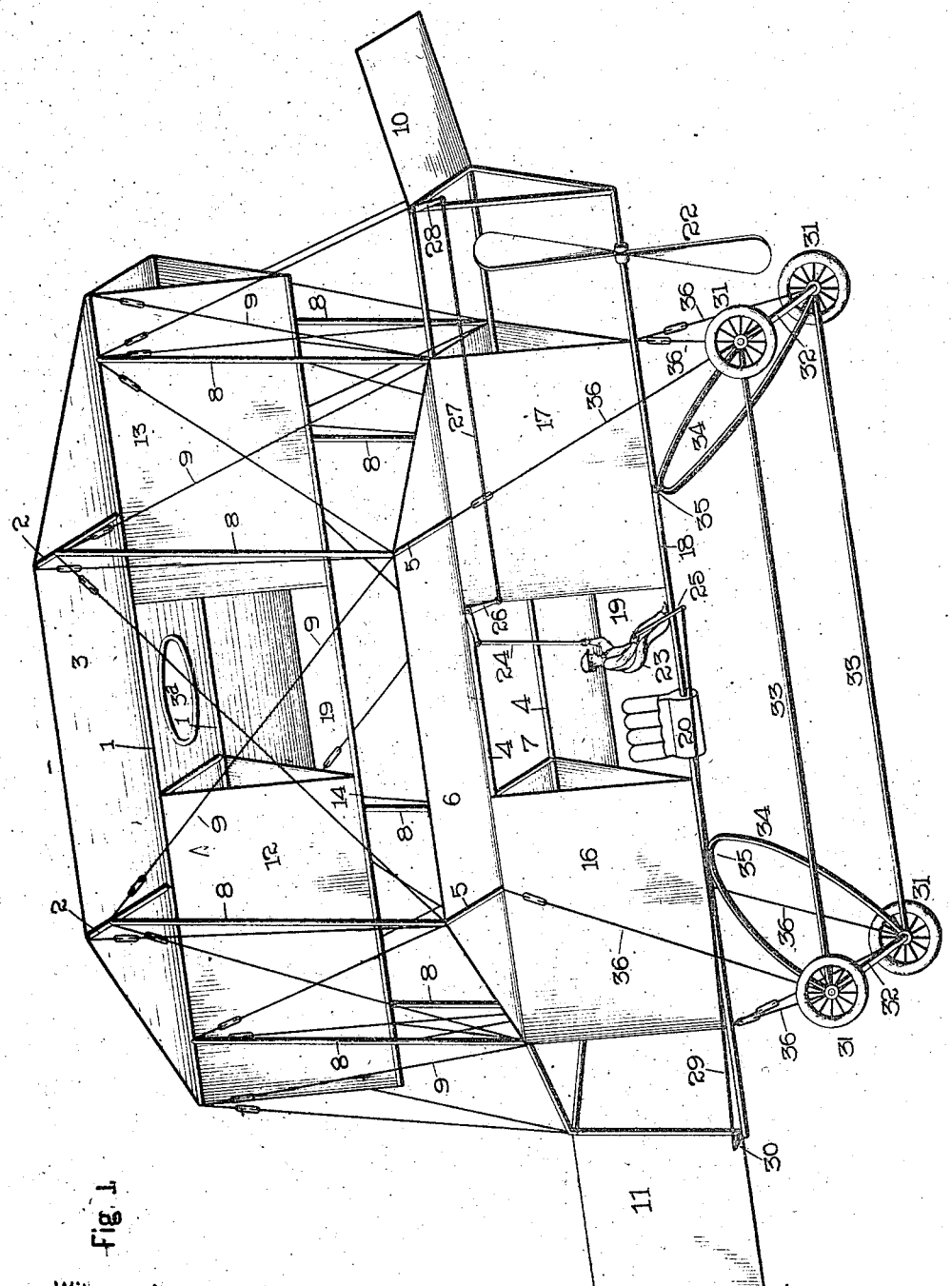

G. F. MENTZ.
AEROPLANE.
APPLICATION FILED NOV. 10, 1910.

1,034,638.

Patented Aug. 6, 1912.
2 SHEETS—SHEET 1.

Witnesses
Inventor
George F. Mentz.
By Attorney.

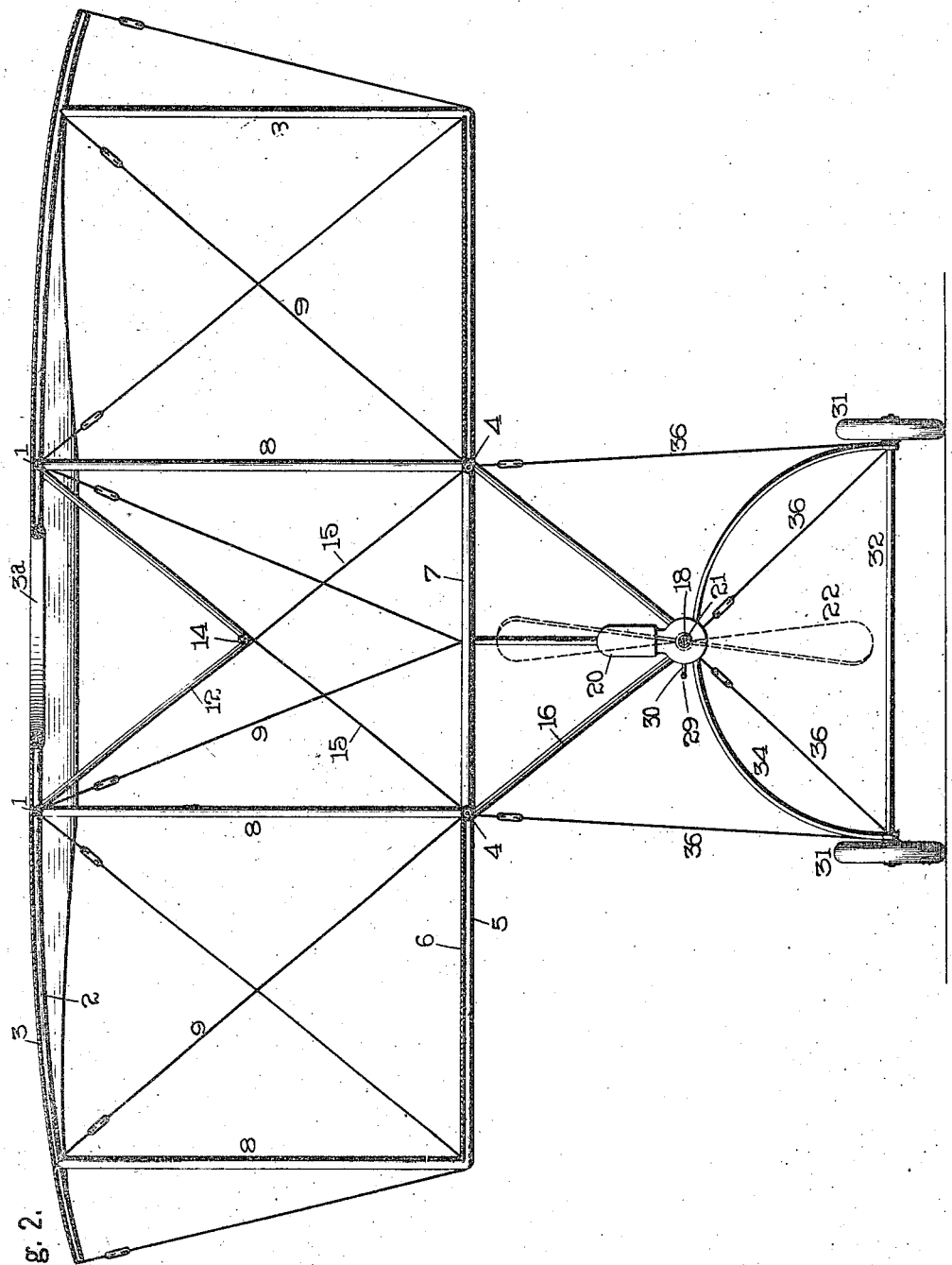

UNITED STATES PATENT OFFICE.

GEORGE F. MENTZ, OF ATTICA, NEW YORK, ASSIGNOR, BY MESNE ASSIGNMENTS, TO UNITED AVIATION COMPANY, A CORPORATION OF NEW YORK.

AEROPLANE.

1,034,638. Specification of Letters Patent. Patented Aug. 6, 1912.

Application filed November 10, 1910. Serial No. 591,558.

*To all whom it may concern:*

Be it known that I, GEORGE F. MENTZ, a citizen of the United States, residing at Attica, in the county of Wyoming and State of New York, have invented new and useful Improvements in Aeroplanes, of which the following is a specification.

This invention relates to improvements in power driven flying machines of the class popularly known as aeroplanes, and primarily to the means for securing stability when moving rapidly through the atmosphere, and for safely alighting upon the ground when the motor or power producing plant has stopped.

The principal objects of the invention are to automatically balance the machine, when flying, in position against lateral tilting or tipping, and to automatically maintain the machine, when descending, approximately horizontal on its axis, and thus enable it to descend slowly and alight safely. The first of these objects is attained by providing supplementary diagonal planes which are attached to and extend from the main plane or planes and form deflecting planes that prevent lateral movement or side sway of the machine in the air, and the second of these objects is secured by forming a passage or opening, or passages or openings, in the main plane or planes through which a current of air passes when the machine is descending, forming an air column which serves to support and maintain the machine with its plane or planes in an approximately horizontal position.

The invention also relates to certain details of construction, which will be hereinafter described and perhaps claimed, reference being had to the accompanying drawings, in which,—

Figure 1 is a perspective view of an adaptation of the improved aeroplane. Fig. 2 is a central transverse section through the improved aeroplane.

In referring to the drawings in detail, like numerals designate like parts.

This invention is designed to almost entirely obviate the danger of flying with a heavier than air machine or aeroplane, by automatically insuring the stability of the machine when in operation, and also providing for the safe descent of the same. These very necessary purposes are accomplished first by providing supplemental diagonal planes which extend longitudinally of the machine or in the direction of the line of flight, and serve to automatically maintain the lateral stability of the machine while flying, and second by forming air passages or openings in the main planes through which vertical columns of air pass, thus insuring the slow, gradual and safe descent of the machine to the ground.

In the adaptation of the invention shown in the accompanying drawings, an aeroplane is shown of the type known as biplane, which consists of two planes arranged one above the other with an intervening air space between them. These planes will hereinafter be respectively termed the upper and lower main planes. The upper main plane may be substantially flat as shown in Fig. 1, or may be curved as shown in Fig. 2, and it is provided with a frame in the form of a cross which is composed of two longitudinal frame members 1, arranged in parallel separated position and two transverse frame members 2 also arranged in parallel separated position and extending at right angles to the members 1. A covering 3 of suitable fabric is secured to the frame and an opening 3ª of suitable size and form is made in the center of the covering for a purpose to be hereinafter described. The lower main plane has a frame similar in form to the form of the upper frame, but smaller in size, which consists of longitudinal members 4 and transverse members 5. A covering 6 of suitable fabric is secured to the frame of the lower plane and is provided with a central opening 7. The upper and lower planes are fastened securely in their parallel separated relation with each other by means of vertical connecting members 8 and diagonal brace wires 9. A horizontal rudder 10 is pivoted at one end of the main planes and a vertical rudder 11 at the opposite end.

The machine is automatically maintained in its horizontal axis when flying by supplemental diagonal planes which extend longitudinally of the machine in the direction of its line of flight when traveling in a straight line, and depend obliquely downward from the main planes and form walls which obstruct the passage of air laterally between the planes and immediately beneath the lower plane, thereby preventing side movement or side sway. These supplemental diagonal planes are arranged in pairs, which are separated from each other at their point of juncture to the main plane and gradually converge together in a downward direction. The two planes 12 and 13 forming the upper pair of supplemental diagonal planes are fastened at their upper edges to the upper plane and at their lower edges to a single longitudinally extending member 14 which is located approximately midway and centrally between the upper and lower main planes. To secure the member 14 in position between the main planes, it is fastened thereto by wires 15. The lower pair of supplemental diagonal planes consists of two planes 16 and 17 which are fastened at their upper edges to the lower plane and at the lower edges to a single longitudinally extending member 18. The diagonal pairs of planes present substantially the appearance of a V when viewed from the front or rear substantially as shown in Fig. 2, which hangs pendent from the main plane and taken in conjunction with the main plane form a triangular box which is open at both ends and has a horizontal top wall and two inclined side walls. The diagonal planes are each divided into two separated parts of equal size thereby leaving central spaces 19 which taken in connection with the openings through the main planes provides a central opening extending completely through the machine from top to bottom thereof as shown in Fig. 1. The advantage of this construction is that the machine in descending through the atmosphere to the ground from an elevated point is sustained in its approximately horizontal position by the pressure of air passing through the central opening. The motor or power producing plant 20 is mounted on the lower member 18 and has its shaft 21 extended through said member 18 which is preferably made tubular, as shown in Fig. 2. A propeller 22 is mounted at the forward end of said shaft 21.

A suitable seat 23 for the aviator is provided in front of the motor and controlling levers 24 and 25 for the horizontal and vertical rudders are located within convenient reach of the aviator when seated thereon. The lever 24 is connected to the horizontal rudder by a system of cranks and connecting rods 26, 27 and 28 and the lever 25 is connected to the vertical rudder by a connecting rod 29 and crank 30, as shown in Fig. 1.

The machine is supported while on the ground by pneumatic tired wheels 31, which are journaled in pairs at the opposite ends of axles 32. The axles are connected by longitudinal rods 33, and are supported beneath the member 18 by inverted U shaped bars 34. The U shaped bars are fastened by clips 35 to the member 18 at their middle and are arranged to extend diagonally downward to the axles 32 to which their lower ends are fastened. Brace wires 36 are also extended from the axles 32 to the member 18 to additionally strengthen and brace the axles in their position.

In flying with this machine, the aviator starts his motor which rotates the propeller and draws the machine along the ground, and when he has secured sufficient momentum, he elevates or tilts his horizontal rudder which starts him from the ground. In descending the aviator may coast diagonally to the ground in the usual way, or if the motor has stopped and the machine has lost its momentum, he can drop slowly with the machine automatically sustained in its horizontal position by the passage of a column of air through the central opening therein.

In the biplane adaptation illustrated the opening in the lower plane is approximately square or rectangular, while the opening in the upper plane is round and considerably smaller in area than the opening in the lower plane. It will also be noted by referring to the drawings that the motor for driving the machine is located in the vicinity of the air column passing through the openings in the planes so that said air column serves to appreciably assist in cooling the motor. The members of the frame may be made of light material, such as bamboo, or other suitable wood, or of thin metal tubing as desired.

Without limiting myself to the precise construction or arrangement of any or all of the parts shown and described or confining myself to a combination of any or all of said parts except as hereinafter particularly pointed out in the following claim, I claim—

In a machine of the class described, a biplane consisting of an upper main plane provided with a central opening, a lower main plane in separated arrangement below the upper main plane and provided with a central opening registering vertically with the central opening through the upper main plane, and supplementary balancing planes arranged in V form and hung pendent from the upper main plane with their separated upper ends fastened to the upper main plane and their connected lower ends fastened to the lower main plane; said supplementary balancing planes having their middle portions located between the central openings in the upper and lower planes removed to provide a central vertical opening extending completely through the machine.

GEORGE F. MENTZ.

Witnesses:
   A. J. SANGSTER,
   L. M. SANGSTER.